March 30, 1965
J. E. LOVELOCK
3,176,135
APPARATUS FOR DETECTING AND ANALYSING LOW
GASEOUS CONCENTRATIONS
Filed Jan. 23, 1961
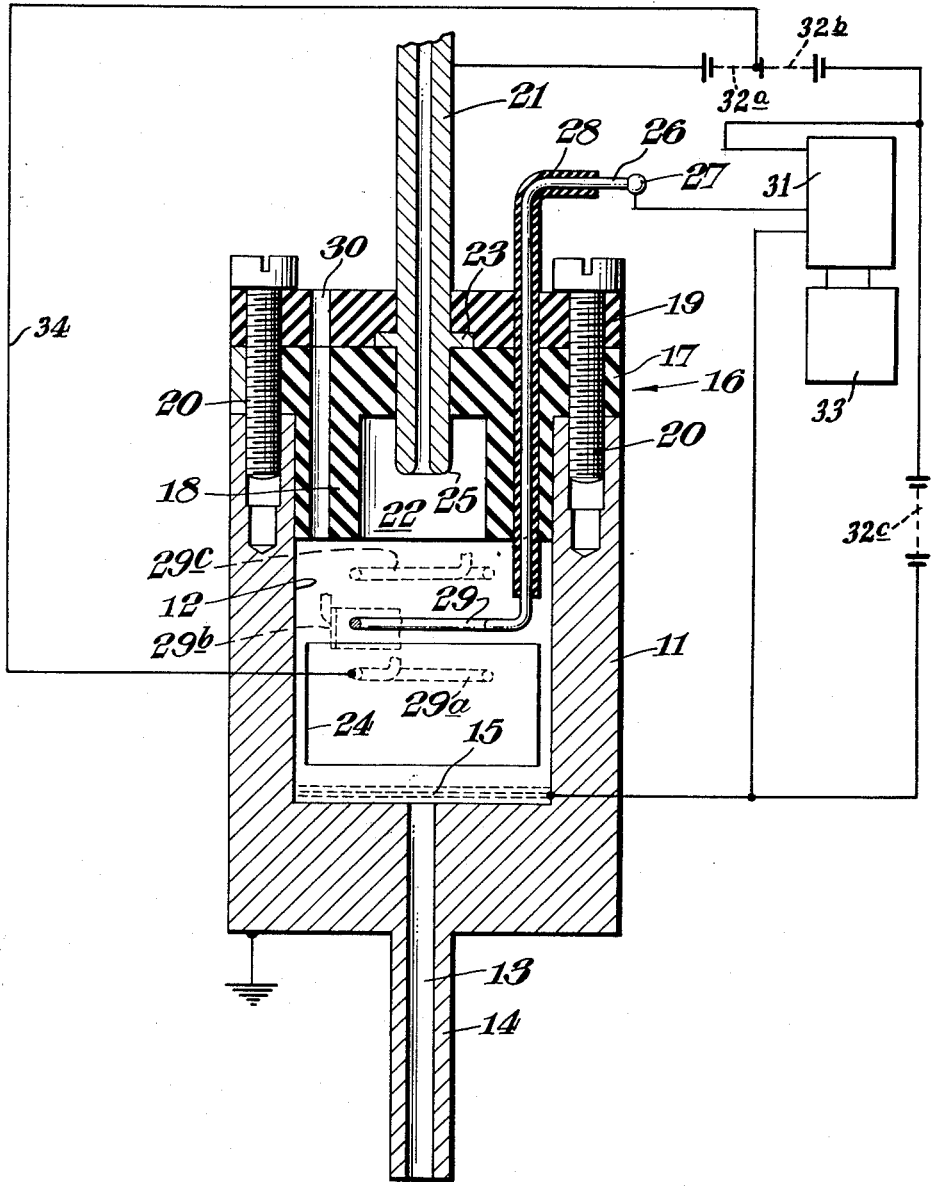
INVENTOR
James Ephraim Lovelock
BY
Larson and Taylor United States Patent Office 3,176,135
Patented Mar. 30, 1965

3,176,135
APPARATUS FOR DETECTING AND ANALYSING LOW GASEOUS CONCENTRATIONS
James Ephraim Lovelock, Mill Hill, London, England, assignor to National Research Development Corporation, London, England, a British body corporate of England
Filed Jan. 23, 1961, Ser. No. 84,195
Claims priority, application Great Britain, Jan. 26, 1960, 2,792/60
10 Claims. (Cl. 250—83.6)

This invention relates to gas chromatography. It is particularly concerned with the detection and/or analysis of low concentrations of gases and vapours and is an improvement in or modification of the inventions described and claimed in my co-pending United States patent applications Serial No. 733,429, now Patent No. 3,046,396 (which will be referred to as "the first application") and No. 837,924, now Patent No. 3,110,809 (which will be referred to as "the second application").

In the first application there is disclosed a method of detecting and/or measuring low concentrations of gaseous or vapourised substances in which the said substances are introduced in low concentration into an atmosphere of a rare gas having an excitation potential equal to or higher than the ionisation potential of the substances, the rare gas atoms are excited partially to a metastable state, and the concentration of ions in the presence of the substances is determined relative to the concentration in the absence thereof. In the first application there is also described and claimed apparatus for use in carrying out the method comprising a detector chamber adapted for connection to a source of rare gas, means for rendering the rare gas atoms partially metastable within the chamber, and means for determining the concentration of the ions in the rare gas atmosphere in the presence or absence of low concentrations of gaseous or vapourised substances. The method and apparatus disclosed in the first application are intended for use in conjunction with a gas chromatography column of the normal, known kind.

The second application discloses a modified form of detector which is particularly adapted for use with the more recently developed capillary chromatography column, made from narrow gauge metal capillary tubing. It provides a method of detecting and/or measuring low concentrations of gaseous or vapourised substances for use with a capillary chromatography column in which the detector chamber in which ionising radiation may be directed to liberate primary electrons possesses a substantial volume (which may be of the order of 1 to 10 millilitres), the sensing volume within the chamber being restricted in operation to a space immediately adjacent both the collecting electrode and the discharge point of the column by the use of a collecting electrode which is very small in relation to the volume of the chamber and is cosely adjacent the discharge point, and in which a scavenging gas flows through the chamber to sweep out of the chamber mixture escaping from the sensing volume. The second application also discloses apparatus comprising a metal chamber open at one end, an insulating plug closing the open end of the chamber, and a hollow insulating member enclosing the end of the capillary column projecting through the insulating plug into the chamber.

The method and apparatus disclosed in the first and second applications are highly efficient in operation and very sensitive. The ultimate sensitivity is, however, reached when the variation in ionisation current due to a small vapour concentration is of the same order as the random fluctuations of the primary ionisation current in the absence of the vapour concentration. In practice it is found that as little as $10^{-13}$ gms. of most compounds may be detected in one second. Such a degree of sensitivity is high compared with that produced by other, known apparatus. It is, however, desirable to be able to increase the sensitivity even more.

The present invention is based on the realisation that a very substantial increase in sensitivity would be possible if the primary ionisation current could be separated from the small signal current arising from a very low concentration of the gaseous or vapourised substances. Accordingly, the primary object of the invention is to provide a method aind apparatus for detection which possess a far higher degree of sensitivity in detection than has hitherto been possible.

The invention sets out to achieve this objective by introducing a third electrode into the ionisation chamber, whose function is to collect the positive ions formed by the reaction between the vapour and the metastable argon or other carrier gas, the positive ions and electrons formed in the gas by the radiation from the ionising source being collected by the normal cathodic and anodic electrodes respectively. Hence, another object is to provide an ionisation chamber in which there is at least one additional electrode.

The addition of the third electrode produces an almost complete separation of the primary electron current from the positive ion signal current but a very small "background" positive ion current is still received by the third or collector electrode in the absence of vapour. The sensitivity may be still further improved by the inclusion of a fourth, positively charged, electrode. By correctly placing the fourth electrode and applying the correct potential thereto the distribution of the electric field in the chamber may be improved, thus indirectly decreasing the "background" current. A further object is therefore to provide an ionisation chamber in which there are two electrodes in addition to the anode and the cathode.

Broadly, the invention consists of apparatus for detecting and/or measuring small concentrations of gaseous or vapourised substances in which the said substances are introduced in low concentrations into an atmosphere of a rare gas, acting as carrier, having an excitation potential equal to or higher than the ionisation potential of the substance(s) and substantially free from impurities of lower excitation potential, comprising a closed chamber, an inlet at one end of the chamber for the carrier gas containing the said substance(s), an inlet at another part of the chamber for a scavenging gas, an outlet at a further part of the chamber for the said scavenging gas, an anode within the chamber closely adjacent the said inlet for the carrier gas, a source of free electrons within the chamber, a cathode within the chamber, and a collector electrode within the chamber disposed between the cathode and the anode.

An auxiliary electrode, also disposed between the anode and the cathode, may be included, the auxiliary electrode being maintained at a positive potential with respect to the collector electrode. Conveniently the chamber is cylindrical in form, the inlet for the carrier gas being centrally placed at one end of the chamber and being made of metal and also constituting the anode, the cathode being centrally placed at the other end of the chamber, the source of free electrons being in electrical connection with the cathode, the collector electrode being in the form of a ring mounted between the anode and the cathode and coaxial therewith, the inlet for the scavenging gas being at the cathode end of the chamber and the outlet for the scavenging gas being at the anode end of the chamber.

One embodiment of the invention will now be described, by way of example, having reference to the accompanying drawing. As shown in the drawing the detector according to the invention comprises a body 11 which may conveniently be made of brass. The body is cylindrical and has a cylindrical bore 12 extending from one end through most of its length to form the detector chamber. From the closed end of the bore 12 a small bore 13 extends through the remainder of the length of the main body and also through a cylindrical extension 14. The extension 14 is adapted to have a tube fitted to it. At the bottom of the bore 12 several layers of metal gauze 15 are provided to form a cathode which will allow gas entering through the bore 13 to pass through it into the chamber.

The chamber is closed by a closure member 16 which is in the form of a flat plate 17 having a downwardly extending tubular portion 18, the outer diameter of which is a registering fit in the bore 12. Above the flat plate 17 is a retaining disc 19, the member 16 and the disc 19 being secured to the body 11 by means of screws 20. Both the member 16 and the disc 19 may conveniently be made of polytetrafluoroethylene.

The member 16 and the disc 19 are both formed with a central bore through which the end of a capillary metal tube 21 extends into the inner part 22 of the tubular portion 18, which constitutes the sensing volume. The capillary tube 21, which is the end of a capillary gas chromatography column, is provided with a flanged portion 23 which fits into a recess in the disc 19 and is held in position by the latter. A tubular tritium-containing source of beta radiation 24 is supported inside the chamber near the cathode 15 and is electrically connected to the body 11.

In the arrangement described the capillary tube 21 is electrically connected so that it also constitutes the anodic electrode and for this reason the inner and outer diameters at the end of the tube are rounded to a semi-circular cross-section, the rounded portion forming an anode 25.

What has been described so far is, in general, similar to known two-electrode ionisation chambers. According to the present invention a third electrode 29, which functions as a collector electrode, is disposed between the anode 25 and the cathode 15. The third electrode 29 is a ring formed from a wire of which a part 26 passes out of the chamber and has a spherical end 27. The part 26 is encased for most of its length in an insulating tube 28. The wire 26 and the tube 28 both pass through the disc 19, and through the flat part 17 and the wall of the tubular portion 18 of the member 16 in a direction parallel to the chamber axis.

As shown in the drawing, the spherical end 27 of the rod 26 is connected to one input terminal of an amplifier, represented by the block 31, and the other input terminal of the amplifier is connected to a tapping on a voltage source in three sections 32a, 32b and 32c. The output terminals of the amplifier 31 are connected to indicating means represented by the block 33. The amplifier 31 and indicating means 33 may be of any suitable type and do not form a part of the invention per se. A further terminal on the amplifier 31 is connected, with the negative end of section 32c of the voltage source, to the cathode 15 and the body 11 which, as indicated on the drawing, are at ground potential. The positive end of the section 32a of the voltage source is connected to the capillary tube 21.

In operation the anode 25 is conveniently maintained at a potential of between 600 and 2000 volts positive with respect to the collector electrode 29, while the cathode 15 may be maintained at a potential of between zero and 100 volts negative with respect to the collector electrode.

The extension 14 is intended for a connection through which a scavenging gas, which is conveniently pure argon, is passed into the chamber. The scavenging gas leaves the chamber through a number of ducts 30 passing through the member 16 and the disc 19 in a direction parallel to the chamber axis.

In operation the substances to be analyzed are carried down the bore of the column 21 by a carrier gas, which is conveniently pure argon, and into the chamber. The beta particles emitted from the source 24 collide with atoms of the gas in the chamber and produce free electrons. The free electrons are accelerated by the high potential between the anode 25 and the cathode 15, to an energy level such that when they collide with atoms of the carrier gas in the neighbourhood of the anode 25 the atoms of carrier gas are excited to a metastable state. The atoms of metastable carrier gas collide with molecules of the substances being carried into the chamber from the column 21 and ionise them. This causes current to flow to the collector electrode 29 and thence to the outer connection 27 thereof, the magnitude of the current depending upon the extent to which the molecules of the substances have been ionised and, under steady conditions, depending upon the quantity of molecules of the substances which are present in the sensing volume of the chamber. A steady stream of argon passes into the chamber through the bore 13, through the cathode 15 and out through the exit ducts 30 carrying with it molecules of the substances which have been detected and have passed out of the sensing volume of the chamber. The end 27 of the electrode 29 and the body 11 are connected to amplifying equipment.

In the figure the body 11 is shown grounded but it is a matter of choice and convenience as to which electrode is held at ground potential. If the column and the anode 25 are at ground potential then the cathode 15 is at a high negative potential and it may be convenient to make the chamber of glass, in the form of a round cup, with a stem projecting centrally from the closed end. The stem is hollow and a tube adapted for connection to a supply of scavenging gas is sealed at right angles in the stem near its end. A metal rod of smaller diameter than the passage in the stem is sealed into the closed end of the stem and passes through the passage into the chamber. A circular metal plate forming the cathode is attached to the end of the rod inside the chamber, the cathode being centrally disposed within the chamber and lying in a plane transverse to the axis thereof. Attached to the inner face of the cathode is a tritium-containing source of beta radiation which constitutes the source of free electrons. The open end of the cup is closed by a member similar to the member 16 and a disc similar to the disc 19 may be fitted. The remainder of the construction may be similar to that shown in the figure.

Due to the presence of the collector electrode the ionisation current resulting from the collisions between metastable gas atoms and molecules of the substance(s) is almost completely separated from the primary ionisation current. In consequence, much smaller ionisation currents due to the substance(s) can be detected.

The ultimate sensitivity of the detector according to the invention is between ten times and one hundred or more times more than that of the previously known diode detectors. The virtual absence of the primary ionisation current at the output of the detector is also of great practical convenience where it is required to integrate the output signal from the detector.

Although the arrangement described produces an almost complete separation of the primary electron current from the positive ion signal current, there still remains a small residual or "background" current which is received by the collector electrode in the absence of vapour in the chamber. This is presumably due to the collection of argon positive ions liberated by the radio-active source and also produced at the anode by ion multiplication. According to another feature of the invention a further electrode, i.e., a fourth electrode, may be included in the chamber. This may be in the form of a ring similar to the ring 29 and it may be disposed either between the cathode 15 and the collector electrode 29, as indicated in dotted lines at 29a, or it could be in the form of a ring surrounding the collector electrode 29, as indicated by dotted lines at 29b, or it might be placed between the collector electrode 29 and the anode 25, as indicated by dotted lines at 29c. So far as can be established at present the main advantage of the fourth electrode is that when correctly shaped and positioned it results in a more uniform electric field distribution within the chamber and so increases the effectiveness of the third electrode and the ionisation efficiency of the detector. The fourth electrode is maintained at a potential which is positive with respect to the collector electrode but is less positive than the anode. The fourth electrode is connected by a line 34 to a tapping between the two sections 32a and 32b of the voltage source. This line is shown connected to 29a but it would be connected instead to 29b or 29c if the electrode were in either of those positions.

The ionisation chamber shown in the figure is considerably enlarged and the dimensions of the capillary tube 21 are exaggerated within the enlargement in the interests of clarity. In a practical embodiment the overall diameter of the body 11—that is, the horizontal dimension across this element—is about 0.6 inch and the bore diameter of the capillary tube is 0.01 inch, the outer diameter of the tube being also relatively smaller than that shown. The other dimensions are approximately in correct proportion.

I claim:

1. Apparatus for detecting and measuring small concentrations of gaseous substances in which said substances are introduced in low concentration into an atmosphere of a rare gas acting as carrier having an excitation potential not less than the ionisation potential of said substances and being substantially free from impurities of lower excitation potential, comprising a closed chamber, means to produce free electrons within said chamber, an inlet to said chamber for said carrier gas and substances, an anode and a cathode in said chamber for connection to a source of potential to apply an electric field to accelerate electrons in said chamber to an energy level sufficient to excite atoms of said carrier gas to a metastable state upon collision therewith, said anode being adjacent said carrier gas inlet, whereby molecules of said substances in said chamber are ionised by collision with said metastable gas atoms, a third electrode in said chamber to collect the ionisation current, and an inlet and an outlet in said chamber for a scavenging gas to sweep away molecules which have been ionised and detected.

2. Apparatus as claimed in claim 1 comprising a fourth electrode within said chamber maintainable at a positive potential with respect to said third electrode to modify the distribution of said field.

3. Apparatus as claimed in claim 1 in which said means to produce free electrons comprise a source of radio-active particles within said chamber, said particles liberating electrons upon collision with gas atoms within said chamber.

4. Apparatus as claimed in claim 1 comprising a metal capillary gas chromatography column from which said carrier gas and substances issue, in which the end of said column projects through said carrier gas inlet into said chamber, the end of said tube constituting said anode.

5. Apparatus as claimed in claim 4 in which the inner and outer diameters at the end of said tube are rounded to produce a semi-circular wall cross-section.

6. Apparatus for detecting and measuring small concentrations of gaseous substances in which said substances are introduced in low concentration into an atmosphere of a rare gas acting as carrier having an excitation potential not less than the ionisation potential of said substances and being substantially free from impurities of lower excitation potential, comprising a body having a cavity open at one end, a closure member to close the open end of said cavity and form a chamber, a cathodic electrode at the bottom of said cavity for connection to a source of potential, an inlet at the bottom of said cavity for a scavenging gas, an inlet for said carrier gas and substances projecting through said closure member into said chamber, said carrier gas and substances inlet being made of metal and being connectable to said source of potential, the end of said carrier gas and substances inlet in said chamber constituting an anodic electrode, a source of radio-active particles in said chamber in electrical connection with said cathodic electrode, said particles producing free electrons by collision with gas atoms in said chamber, the electric field set up between said anodic and cathodic electrodes causing acceleration of said electrons to an energy level sufficient to excite atoms of said rare gas to a metastable state upon collision therewith, molecules of said substances being ionised by collision with metastable gas atoms, a third electrode between said anodic and cathodic electrodes supported by said closure member and insulated from the other electrodes for collecting the ionisation current, and a plurality of outlets for said scavenging gas in said closure member.

7. Apparatus as claimed in claim 6 in which said body is made of metal and said cathodic electrode and said source of radiation are in electrical connection therewith.

8. Apparatus as claimed in claim 6 in which said closure member is made of insulating material and comprises a small cavity forming a sensing volume within said chamber, said carrier gas and substances inlet projecting into said cavity, said carrier gas and substances being swept out of said chamber by said scavenging gas upon escaping from said sensing volume.

9. Apparatus as claimed in claim 8 in which said carrier gas and substances inlet is constituted by the end of a capillary gas chromatography column.

10. Apparatus as claimed in claim 6 comprising a fourth electrode between said anodic and cathodic electrodes maintainable at a positive potential with respect to said third electrode to modify the distribution of said electric field.

References Cited by the Examiner
UNITED STATES PATENTS

| | | | |
|---|---|---|---|
| 2,981,840 | 4/61 | Nahmias | 250—83.6 X |
| 2,994,768 | 8/61 | Derfler | 250—83.6 X |
| 3,009,063 | 11/61 | Roehrig | 250—83.6 |

RALPH G. NILSON, *Primary Examiner.*

ARTHUR GAUSS, ARCHIE R. BORCHELT,
*Examiners.*